US011321660B2

(12) United States Patent
Imaeda et al.

(10) Patent No.: US 11,321,660 B2
(45) Date of Patent: May 3, 2022

(54) VISIT MANAGEMENT SYSTEM, PROGRAM, AND VISIT MANAGEMENT METHOD

(71) Applicant: RAKUTEN GROUP, INC., Tokyo (JP)

(72) Inventors: Shinichi Imaeda, Tokyo (JP); Motoya Tanaka, Tokyo (JP); Kenta Nagazumi, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 490 days.

(21) Appl. No.: 15/104,961

(22) PCT Filed: Dec. 16, 2013

(86) PCT No.: PCT/JP2013/083672
§ 371 (c)(1),
(2) Date: Jun. 15, 2016

(87) PCT Pub. No.: WO2015/092860
PCT Pub. Date: Jun. 25, 2015

(65) Prior Publication Data
US 2016/0321604 A1    Nov. 3, 2016

(51) Int. Cl.
*G06Q 10/08*    (2012.01)
*G06Q 10/10*    (2012.01)

(52) U.S. Cl.
CPC ....... *G06Q 10/0833* (2013.01); *G06Q 10/083* (2013.01); *G06Q 10/1093* (2013.01)

(58) Field of Classification Search
None
See application file for complete search history.

(56) References Cited

U.S. PATENT DOCUMENTS

| 8,015,023 B1* | 9/2011 | Lee | G06Q 10/08 700/226 |
| 2008/0046326 A1* | 2/2008 | Horstemeyer | G08G 1/20 705/14.69 |

(Continued)

FOREIGN PATENT DOCUMENTS

| JP | 2002015239 A | * | 1/2002 |
| JP | 2004-231402 A | | 8/2004 |

(Continued)

OTHER PUBLICATIONS

Moon, Geeju et al. Improved parcel delivery service by using delivery points information and RFID. 2012 8th International Conference on Computing Technology and Information Management (NCM and ICNIT) (vol. 1, pp. 160-164). (Year: 2012).*

(Continued)

*Primary Examiner* — Patricia H Munson
*Assistant Examiner* — Nancy N Prasad
(74) *Attorney, Agent, or Firm* — HEA Law PLLC

(57) ABSTRACT

To increase a chance of meeting a user when visiting a place that is associated with the user while maintaining convenience, provided is a visit management system for managing visit information, which includes at least one of a time and an order at which a place associated with a user is to be visited, the visit management system including: request means for making a given response request to a user terminal if it is determined that a visit is approaching; obtaining means for obtaining a response to the given response request from the user terminal; and visit control means for determining whether or not the visit information is to be changed based on a positional relation between the place and the user that is obtained by the response from the user terminal, and controlling the visit information depending on the determination.

15 Claims, 12 Drawing Sheets

(56) References Cited

U.S. PATENT DOCUMENTS

| | | | | |
|---|---|---|---|---|
| 2010/0145754 A1* | 6/2010 | Rahman | ......... | G06Q 10/06 |
| | | | | 705/28 |
| 2013/0090969 A1* | 4/2013 | Rivere | ......... | G06Q 10/06 |
| | | | | 705/7.19 |
| 2013/0290058 A1* | 10/2013 | Gray | ......... | G06Q 10/1095 |
| | | | | 705/7.19 |

FOREIGN PATENT DOCUMENTS

| JP | 2004-240656 A | 8/2004 |
|---|---|---|
| JP | 2009-288947 A | 12/2009 |
| JP | 2010-092398 A | 4/2010 |
| JP | 2012-224465 A | 11/2012 |

OTHER PUBLICATIONS

Partial Translation of the Office Action for Japanese Patent Application No. 2015-553256 dated Aug. 29, 2017.
English Translation of International Search Report for PCT/JP2013/083672 dated Jan. 14, 2014.

* cited by examiner

FIG.4

| USER IDENTIFICATION INFORMATION | LOCATION INFORMATION | VISIT COMPLETION FLAG | VISIT DATE/TIME | VISIT ORDER |
|---|---|---|---|---|
| 001 | ADDRESS A | 1 | 14:00/12/20/2013 | 1 |
| 003 | ADDRESS B | 2 | 14:20/12/20/2013 | 2 |
| 005 | ADDRESS C | 0 | 15:00/12/20/2013 | 3 |
| ……… | ……… | ……… | ……… | ……… |

VISIT MANAGEMENT SYSTEM, PROGRAM, AND VISIT MANAGEMENT METHOD

CROSS REFERENCE TO RELATED APPLICATIONS

This application is a National Stage of International Application No. PCT/JP2013/083672 filed on Dec. 16, 2013. The content of the above document is incorporated herein by reference in its entirety.

TECHNICAL FIELD

The present invention relates to a visit management system, a program, and a visit management method.

BACKGROUND ART

A technology of managing information about a visit to a user has been known. In Patent Literature 1, there is disclosed a system in which position information is obtained from a user terminal before a delivery person delivers an article for sale to the user and, in the case where a point indicated by the obtained position information is apart from a delivery destination by a given distance or more, it is determined whether or not the delivery destination is to be changed.

CITATION LIST

Patent Literature

[PTL 1] JP 2004-240656 A

SUMMARY OF INVENTION

Technical Problem

The technology of Patent Literature 1 may feel inconvenient to a user when, for example, the delivery destination is changed from the user's home to a place away from home and the user needs to bring a parcel received at that place to home by his/her own hand. There is also a possibility with the technology of Patent Literature 1 that traffic situation, delivery route, and the like, keep a delivery person from meeting a user who has chosen to change the delivery destination at the new delivery destination. Increasing the chance of meeting a user when a delivery person visits a place that is associated with the user while maintaining convenience is therefore sought after.

The present invention has been made in view of the problem described above, and an object of the present invention is therefore to provide a visit management system, a program, and a visit management method with which the chance of meeting a user when a visitor visits a place that is associated with the user is increased while maintaining convenience.

Solution to Problem

In order to solve the problem described above, according to one embodiment of the present invention, there is provided a visit management system for managing visit information, which includes at least one of a time and an order at which a place associated with a user is to be visited, the system including: request means for making a given response request to a user terminal if it is determined that a visit is approaching; obtaining means for obtaining a response to the given response request from the user terminal; and visit control means for determining whether or not the visit information is to be changed based on a positional relation between the place and the user that is obtained by the response from the user terminal, and controlling the visit information depending on the determination.

BRIEF DESCRIPTION OF DRAWINGS

FIG. 4 is a diagram for illustrating an example of visit information.

DESCRIPTION OF EMBODIMENTS

1. Overall Configuration of Visit Management System

Figure 1:
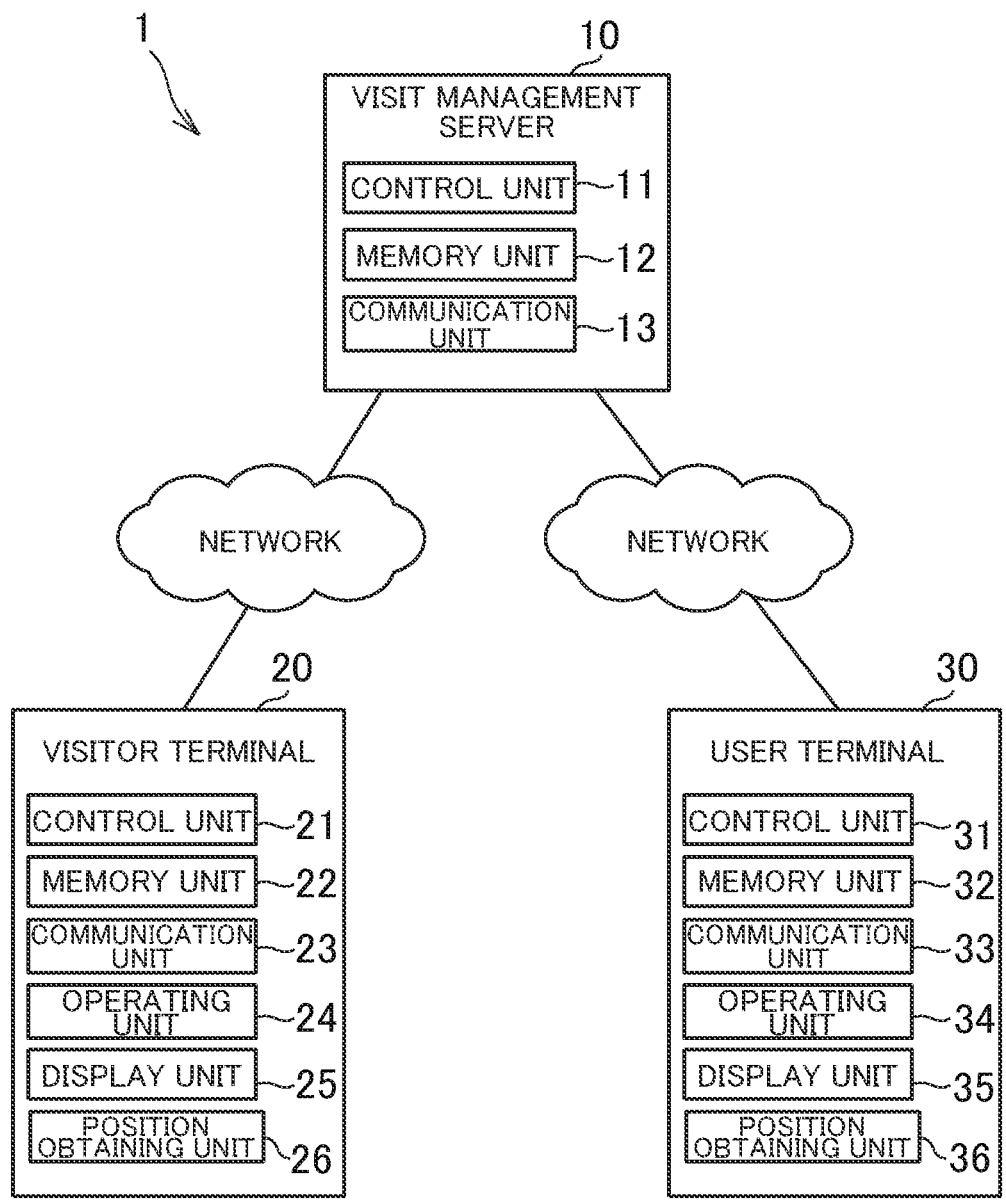
FIG. 1 is a diagram for illustrating an example of an overall configuration of a visit management system according to an embodiment of the present invention.

An exemplary embodiment of the present invention is described below in detail with reference to the drawings. FIG. 1 is a diagram for illustrating an example of the overall configuration of a visit management system according to the embodiment of the present invention. As illustrated in FIG. 1, a visit management system 1 in this embodiment includes a visit management server 10, a visitor terminal 20, and a user terminal 30. While there are one visit management server 10, one visitor terminal 20, and one user terminal 30 in the description given here for the purpose of simplification, the visit management system 1 may include a plurality of visit management servers 10, a plurality of visitor terminals 20, and a plurality of user terminals 30.

The visit management server 10 is a general server computer, and includes a control unit 11, a memory unit 12, and a communication unit 13. The control unit 11 includes, for example, one or more microprocessors. The memory unit 12 includes, for example, a main memory, e.g., a random access memory (RAM) and auxiliary storage, e.g., a hard disk. The control unit 11 executes processing in accordance with programs and data that are stored in the memory unit 12. The communication unit 13 includes a network card, and is capable of exchanging data with the outside over a network.

The visitor terminal 20 is a computer operated by a visitor, for example, a portable terminal or a vehicle-mounted unit.

The visitor terminal 20 includes a control unit 21, a memory unit 22, a communication unit 23, an operating unit 24, a display unit 25, and a position obtaining unit 26. The hardware configurations of the control unit 21, the memory unit 22, and the communication unit 23 are substantially the same as the hardware configurations of the control unit 11, the memory unit 12, and the communication unit 13, and thus descriptions thereof are omitted. The operating unit 24 is an input device (e.g., a touch panel) through which a user operates the visitor terminal 20. The display unit 25 is a monitor configured to display various screens. The position obtaining unit 26 is equipment configured to obtain position information by receiving a signal from the outside, and includes, for example, a Global Positioning System (GPS) receiver.

The user terminal 30 is a computer operated by a user, for example, a mobile phone or a personal computer. The user terminal 30 includes a control unit 31, a memory unit 32, a communication unit 33, an operating unit 34, a display unit 35, and a position obtaining unit 36. Those configurations are substantially the same as the hardware configurations of the control unit 21, the memory unit 22, the communication unit 23, the operating unit 24, the display unit 25, and the position obtaining unit 26, and thus descriptions thereof are omitted. The following description assumes that the user has agreed to provide position information of the user terminal 30 when using the visit management system 1. In other words, position information of the user terminal 30 is not provided in the case where the user does not grant a request to obtain position information of the user terminal 30.

General pieces of hardware are applicable as the devices described above, and the hardware configurations of the devices are not limited to those of the described example. Programs and data that are stored on the devices in the description may instead be supplied by a computer-readable information storage medium (e.g., a memory card) that stores the programs and data, or may be supplied over a network.

Figure 2:
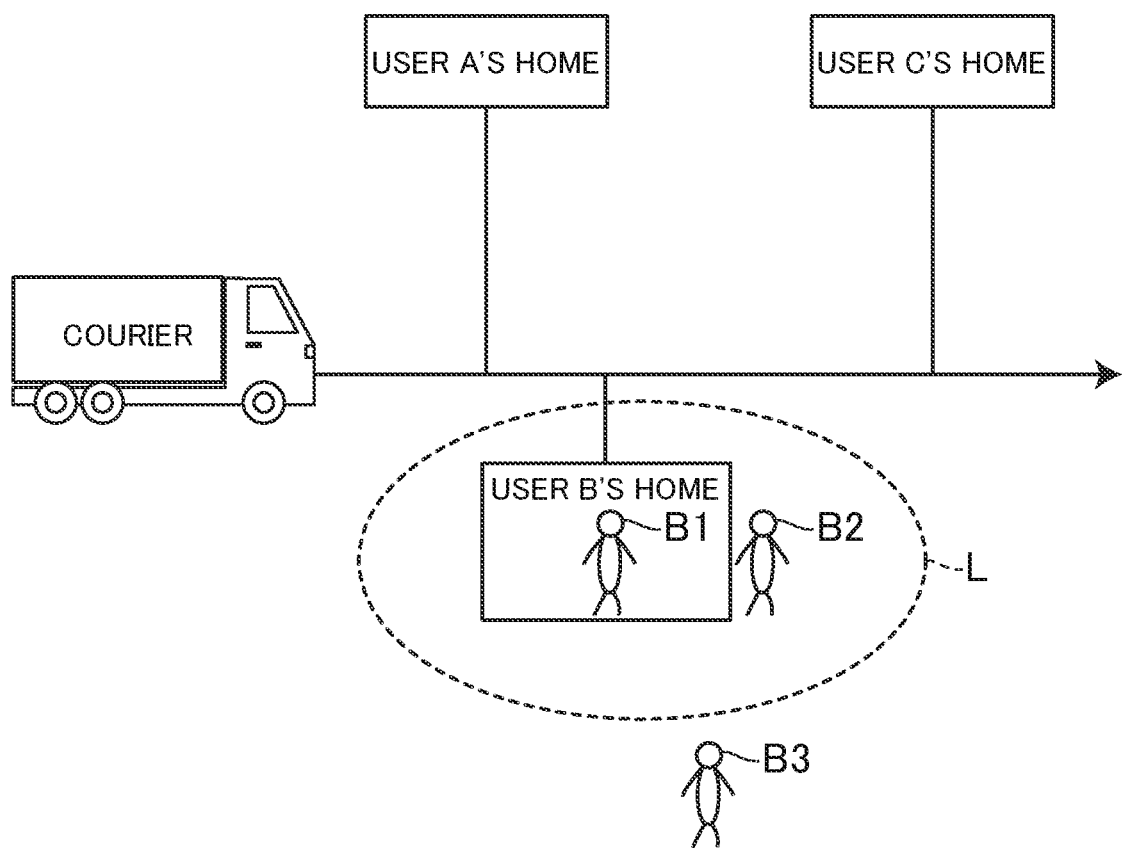
FIG. 2 is a diagram for outlining processing that is executed by the visit management system.

Processing executed by the visit management system 1 is described in this embodiment by taking as an example a scene in which a physical distribution company (courier) delivers parcels to a plurality of delivery destinations in order. A parcel here may be, for example, an article for sale ordered by a user through electronic commerce and shipped from a store, or a C to C parcel, which is sent from one user and delivered to another user. FIG. 2 is a diagram for outlining the processing that is executed by the visit management system 1. In the case where a courier delivers parcels to a user A, a user B, and user C in the order stated as illustrated in FIG. 2, it is identified whether or not the user B is at home or in the vicinity of the user B's home (whether or not the user B is in one of states B1 and B2, which are inside the broken line L of FIG. 2) when the courier finishes delivery to the home of the user A and approaches the home of the user B, based on position information of the user terminal 30 that is operated by the user B.

In the case where the user B is at home or in the vicinity of the user B's home, the visit management system 1 makes no change to the delivery time or the delivery order and the courier delivers to the user B as scheduled. In the case where the user B is at a point apart from the user B's home (a state B3, which is outside the broken line L of FIG. 2), on the other hand, the visit management system 1 makes an inquiry to the user B about whether or not delivery is to be delayed. Depending on the answer to the inquiry, the visit management system 1 puts the delivery to the user B after the delivery to the User C, thereby increasing the chance that the user B is at home when the courier visits the home of the user B for delivery. In other words, the visit management system 1 is configured so as to reduce the probability that the user B is not at home when the courier visits the home of the user B for delivery. Details of this technology are described below.

2. Functions Implemented in the Visit Management System

Figure 3:
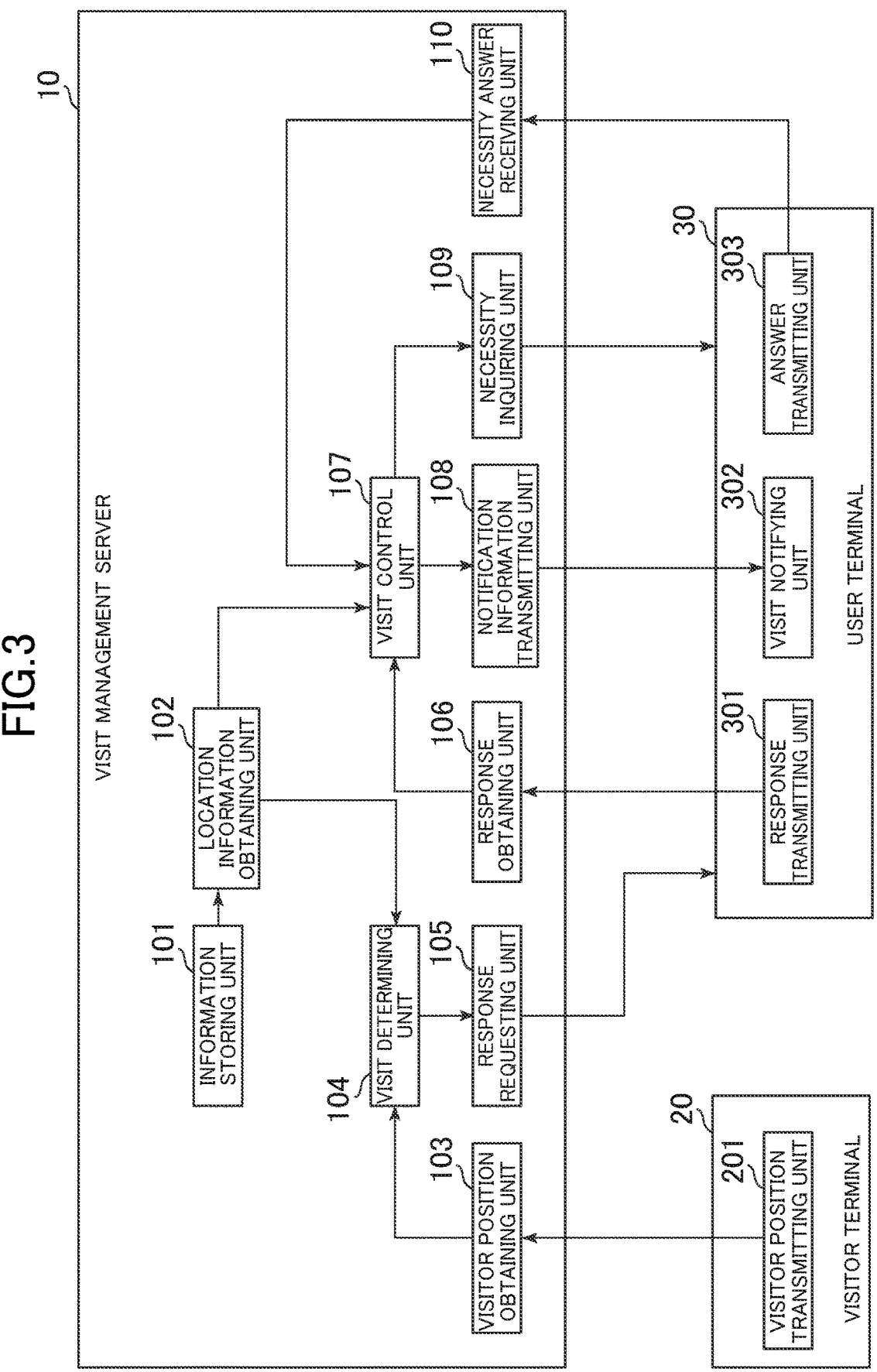
FIG. 3 is a function block diagram of the visit management system.

FIG. 3 is a function block diagram of the visit management system 1. In this embodiment, the visit management server 10, the visitor terminal 20, and the user terminal 30 implement functions described below.

2-1. Functions Implemented by the Visit Management Server

The visit management server 10 includes an information, storing unit 101, a location information obtaining unit 102, a visitor position obtaining unit 103, a visit determining unit 104, a response requesting unit 105, a response obtaining unit 106, a visit control unit 107, a notification information transmitting unit 108, a necessity inquiring unit 109, and a necessity answer receiving unit 110. The information storing unit 101 is implemented mainly by the memory unit 12. The visit determining unit 104 and the visit control unit 107 are implemented mainly by the control unit 11. The rest of the functions are implemented mainly by the control unit 11 and the communication unit 13.

Information Storing Unit

The information storing unit 101 is configured to store visit information, which includes one or both of the time to visit a place associated with a user (hereinafter simply referred to as "visiting place") (i.e., visiting time) and the order in which the visiting place is to be visited. The time to visit a visiting place is the date/time, time zone, or timing to visit the visiting place. The order in which a visiting place is to be visited is an order at which the visiting place out of a plurality of visiting places is to be visited. In this embodiment, a visiting place is a delivery destination to which a parcel addressed to a user is delivered by a courier, and the visit information therefore includes at least one of a delivery date/time and a delivery order that are to be observed by the courier in delivering the parcel to the delivery destination.

FIG. 4 is a diagram for illustrating an example of the visit information. As illustrated in FIG. 4, the visit information here associates user identification information by which a user is identified, location information, which indicates a visiting place, and a visit completion flag with one another. The user identification information is information by which a user to be visited is identified, and includes, for example, a user ID by which the user is identified uniquely, the user's name and contact address, and individual identification information of the user terminal 30. The location information is information by which the location of a visiting place is identified, and includes, for example, the address of the delivery destination and longitude/latitude information of the delivery destination.

The visit completion flag is information by which whether or not the courier has visited the user is identified, and takes, for example, one of a value indicating that the courier has visited and finished delivery, a value indicating that the courier has visited but has not delivered due to the user's absence, and a value indicating that the courier has not visited the user yet. The visit completion flag changes its values in a manner in which the visitor terminal 20 is operated. For example, the visit completion flag takes as an initial value the value indicating that the courier has not visited the user yet. When the visitor terminal 20 is subsequently operated in a manner that indicates the completion of delivery or a failure to deliver due to the user's absence, and the visit management server 10 receives an input of the operation, the visit completion flag changes to a value that reflects the operation.

Data stored in the information storing unit 101 is not limited to the example given above. For instance, the information storing unit 101 may store data that defines longitude/latitude information of each address and map data necessary to calculate a travel route. The information storing unit 101 may also store data that indicates the association between individual identification information of the user terminal 30 and a user ID.

Location Information Obtaining Unit

The location information obtaining unit 102 is configured to obtain location information that indicates a visiting plate. The location information obtaining unit 102 obtains the location information stored in the information storing unit 101.

Visitor Position Obtaining Unit

The visitor position obtaining unit 103 is configured to obtain position information of the visitor terminal 20. The visitor position obtaining unit 103 obtains position information transmitted from a visitor position transmitting unit 201, which is described later.

Visit Determining Unit

The visit determining unit 104 is configured to determine whether or not a visit is approaching by a predetermined method. The visit determining unit 104 in this embodiment determines whether or not a visit is approaching based on the location information and on the position information of the visitor terminal 20. For example, the visit determining unit 104 determines whether or not a positional relation between a point indicated by the location information and a point indicated by the position information of the visitor terminal 20 is a given positional relation.

More specifically, the visit determining unit 104 determines whether or not a necessary time or a necessary distance to reach a visiting place, which is calculated based on the location information and the position information of the visitor terminal 20, meets a criterion. Here, the necessary time or the necessary distance being within a threshold equals meeting a criterion. The visit determining unit 104 determines that a visit is approaching when the necessary time or the necessary distance meets a criterion, and determines that a visit is not approaching when the necessary time or the necessary distance does not meet a criterion.

The necessary time is a time that is obtained by substituting a point that the location information indicates and a point that the position information of the visitor terminal 20 indicates in a given mathematical expression, and can be, for example, a time necessary for the courier to reach the delivery destination from the current location (namely, the length of time from the current time point to an expected arrival time).

The necessary distance is a distance that is obtained by substituting a point that the location information indicates and a point that the position information of the visitor terminal 20 indicates in a given mathematical expression, and can be, for example, a distance between the current location of the courier and the delivery destination that is measured along a given delivery route (a travel distance necessary to reach the delivery destination), or a distance in a straight line between the current location and the delivery destination.

Various known methods can be applied to the calculation of the necessary time or the necessary distance. For example, the visit determining unit 104 determines a travel route from a point indicated by the position information of the visitor terminal 20 to a point indicated by the location information, and calculates the necessary time or the necessary distance based on the travel route. Traffic jam situation and a predetermined travel speed may be taken into consideration in the calculation.

Response Requesting Unit

The response requesting unit 105 is configured to make a given response request to the user terminal 30 when it is determined that a visit is approaching. For example, the response requesting unit 105 requests position information of the user terminal 30 as a response request.

Response Obtaining Unit

The response obtaining wait 106 is configured to obtain, from the user terminal 30, a response to the response request. For example, the response obtaining unit 106 obtains position information of the user terminal 30 as a response from the user terminal 30.

Visit Control Unit

The visit control unit 107 is configured to determine whether or not the visit information is to be changed based on a positional relation between a visiting place and the user that is obtained by the response from the user terminal 30, and to control the visit information (for example, at least one of the delivery date/time and the delivery order) depending on the determination. Here, delaying or advancing a time or an order, which is indicated by the visit information equals changing the visit information. Not changing the visit information when it is determined that the visit information is not to be changed and executing processing of changing the visit information when it is determined that the visit information is to be changed equals controlling the visit information.

The visit control unit 107 changes the visit information in the case where the obtained positional relation is a given positional relation. For example, the visit control unit 107 does not change the visit information in the case where the obtained positional relation indicates that the user is in a range that is set with the visiting place as a reference (hereinafter referred to as "reference range"), and delays at least one of the time and the order, which are contained in the visit information in the case where the obtained positional relation indicates that the user is not in the range. Here, the user being in the visiting place or a gap between the visiting place and the user's location being within a given amount (the user being in the vicinity of the visiting place) equals the user being in the reference range.

More specifically, the visit control unit 107 performs control based on a positional relation that is obtained from the location information and from the position information of the user terminal 30. For example, the visit control unit 107 determines whether or not a calculated time or distance to the visiting place that is calculated based on the location information and the position information of the user terminal 30 (hereinafter referred to as "estimated time or estimated distance" for clear differentiation from the necessary time or necessary distance described above) meets a criterion.

The estimated time is a time that is obtained by substituting a point that the location information indicates and a point that the position information of the user terminal 30 indicates in a given numerical expression, and can be, for example, a time necessary for the user to reach (return to) the delivery destination from the current location (namely, the length of time from the current time point to an expected arrival time). In the case where a point indicated by the location information and a point indicated by the position information of the user terminal 30 substantially coincide with each other (for example, the estimated distance described below is substantially 0), the estimated time may be deemed as 0.

The estimated distance is a distance that is obtained by substituting a point that the location information indicates and a point that the position information of the user terminal 30 indicates in a given numerical expression, and can be, for example, a distance between the current location of the user and the delivery destination that is measured along a given travel route (a travel distance necessary to reach the delivery destination), or a distance in a straight line between the user's current location and the delivery destination.

Various known methods can be applied to the calculation of the estimated time or the estimated distance, as is the case for the necessary time or the necessary distance. For example, the visit control unit 107 determines a travel route from a point indicated by the position information of the user terminal 30 to a point indicated by the location information, and calculates the estimated time or the estimated distance based on the travel route. The means of travel used by the user (e.g., on foot or the type of the ride), traffic jam situation, and a predetermined travel speed may be taken into consideration in the calculation.

Here, the estimated time or the estimated distance being within a threshold equals meeting a criterion. The visit determining unit 104 determines that the user is in the reference range when the estimated time or the estimated distance meets a criterion, and determines that the user is not in the reference range when the estimated time or the estimated distance does not meet a criterion.

Notification Information Transmitting Unit

The notification information transmitting unit 108 is configured to transmit, when the obtained positional relation indicates that the user is in the reference range, information for notifying the approach of a visit to the user terminal 30. For example, the notification information transmitting unit 108 transmits information for displaying a given message on the user terminal 30.

Necessity Inquiring Unit

The necessity inquiring unit 109 is configured to make an inquiry to the user terminal 30 when the obtained positional relation indicates that the user is not in the reference range about whether or not the visit control unit 107 needs to make a change. The necessity inquiring unit 109 transmits information for displaying a given inquiry message on the user terminal 30.

Necessity Answer Receiving Unit

The necessity answer receiving unit 110 is configured to receive an answer to the inquiry that is input to the user terminal 30. The necessity answer receiving unit 110 receives an answer transmitted by an answer transmitting unit 303. In the case where the answer received by the necessity answer receiving unit 110 indicates that no change is needed, the visit control unit 107 does not change the visit information. In the case where the necessity answer receiving unit 110 does not receive an answer that indicates the non-necessity of the change, the visit control unit 107 delays at least one of the time and the order, which are contained in the visit information.

2-2. Functions Implemented by the Visitor Terminal

The visitor terminal 20 includes the visitor position transmitting unit 201. The visitor position transmitting unit 201 is implemented mainly by the control unit 21 and the communication unit 23. The visitor position transmitting unit 201 is configured to transmit position information of the visitor terminal 20. The visitor position transmitting unit 201 regularly transmits the position information obtained by the position obtaining unit 26 to the visit management server 10.

2-3. Functions Implemented by the User Terminal

The user terminal 30 includes a response transmitting unit 301, a visit notifying unit 302, and the answer transmitting unit 303, which are implemented mainly by the control unit 31 and the communication unit 33.

The response transmitting unit 301 is configured to transmit, when a response request is received from the visit management server 10, a response to the received response request to the visit management server 10. For example, the response transmitting unit 301 transmits position information obtained by the position obtaining unit 36 to the visit management server 10.

Figure 5:
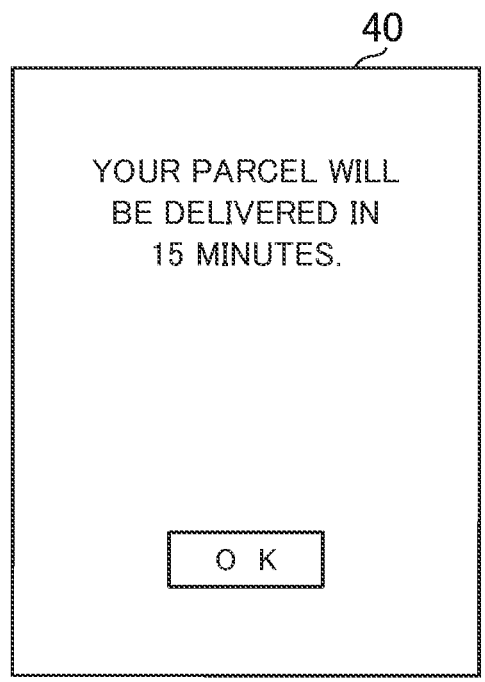
FIG. 5 is a diagram for illustrating an example of a screen that is displayed on a user terminal.

The visit notifying unit 302 is configured to notify the user of the approach of a visit based on information that is received from the visit management server 10. FIG. 5 is a diagram for illustrating an example of a screen that is displayed on the user terminal 30. As illustrated in FIG. 5, the visit notifying unit 302 causes a visit notification screen 40, which includes a message to the effect that the delivery of a parcel by a courier is close, to be displayed when the user terminal 30 receives the information transmitted by the notification information transmitting unit 108.

While a case of displaying a screen that includes a given message is described in this embodiment as a mode of notification, various other notification methods can be employed. For example, the user may be notified through electronic mail, chat (including Instant Messenger and similar types), or audio output. The same applies to notification via various screens described later (an inquiry screen 50, a delivery time window specification screen 60, and a change notification screen 70) besides the notification by the visit notifying unit 302.

Figure 6:
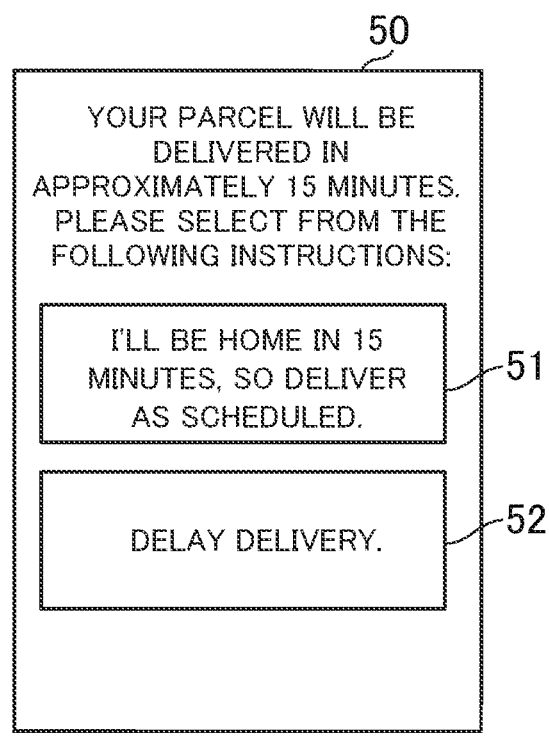
FIG. 6 is a diagram for illustrating an example of a screen that is displayed on the user terminal.

The answer transmitting unit 303 is configured to transmit the user's answer to the inquiry made by the necessity inquiring unit 109. FIG. 6 is a diagram for illustrating an example of a screen that is displayed on the user terminal 30.

As illustrated in FIG. 6, the display unit 35 of the user terminal 30 displays the inquiry screen 50 which prompts the user to give an answer about whether or not delivery is to be delayed, when the user terminal 30 receives the inquiry made by the necessity inquiring unit 109. The inquiry screen 50 displays answer buttons 51 and 52 for giving an answer to the inquiry. The answer transmitting unit 303 transmits an answer selected on the inquiry screen 50 to the visit management server 10.

Figure 7:
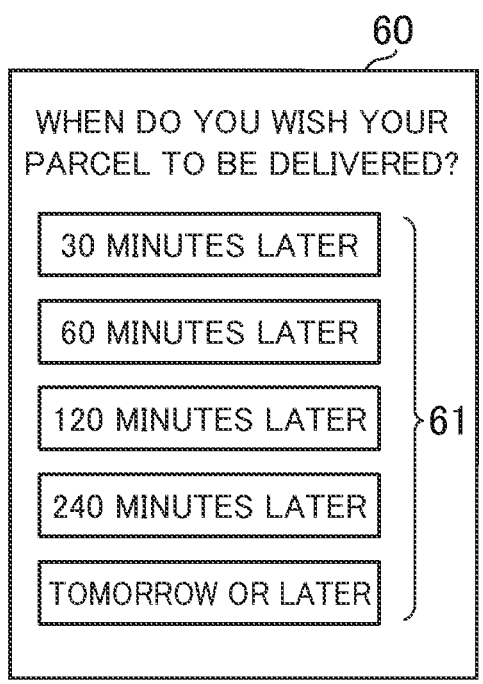
FIG. 7 is a diagram for illustrating an example of a screen that is displayed on the user terminal.

A screen for specifying a delivery date/time and a delivery order may be displayed when the user selects the answer button 52, which indicates that the change is necessary. FIG. 7 is a diagram for illustrating an example of a screen that is displayed on the user terminal 30. As illustrated in FIG. 7, the user may be allowed to specify a new delivery date/time or delivery order on the delivery time window specification screen 60 via buttons 61. The answer transmitting unit 303 in this case transmits a delivery date/time or delivery order specified by the user to the visit management server 10. The visit control unit 107 changes the visit information based on the specified delivery date/time or delivery order.

3. Processing Executed in the Embodiment

Figure 8:
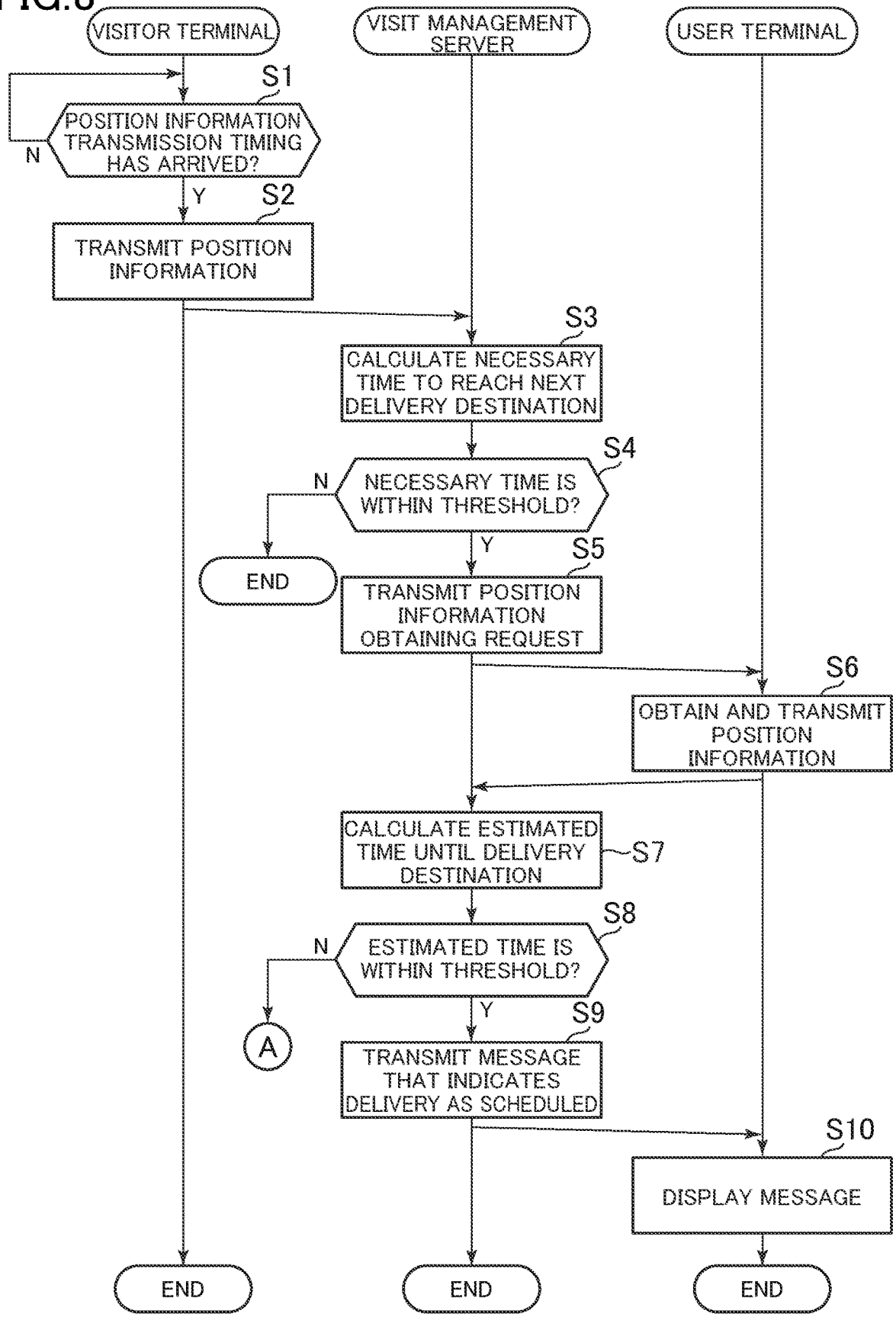
FIG. 8 is a diagram for illustrating processing that is executed in the visit management system.
Figure 9:
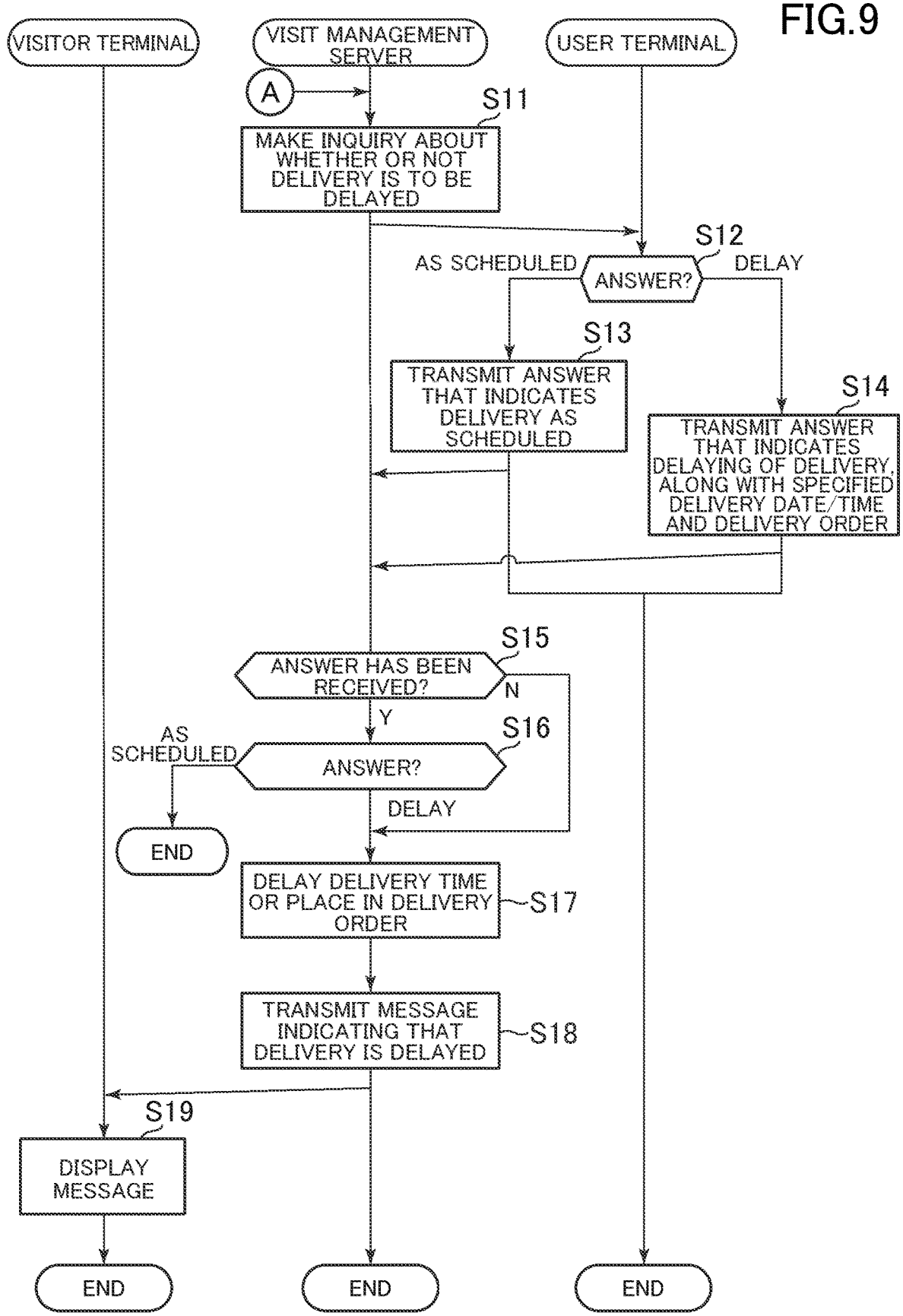
FIG. 9 is a diagram for illustrating processing that is executed in the visit management system.

FIG. 8 and FIG. 9 are diagrams for illustrating processing that is executed in the visit management system 1. Here, the control unit 11, the control unit 21, and the control unit 31 operate in accordance with programs stored in the memory unit 12, the memory unit 22, and the memory unit 32, respectively, thereby executing the processing that is illustrated in FIG. 8 and FIG. 9 and implementing the functions blocks.

As illustrated in FIG. 8, the control unit 21 in the visitor terminal 20 first determines whether or not position information transmission timing has arrived (S1). The control unit 21 determines in S1 whether or not a given length of time (for example, 15 minutes) has elapsed since the last transmission timing. The control unit 21 includes timekeeping means, e.g, a real-time clock, and information indicating that the length of time that has elapsed since the last transmission timing is stored in the memory unit 22.

When it is determined that the transmission timing has arrived (S1: Y), the control unit 21 obtains position information from the position obtaining unit 26 and transmits the position information to the visit management server 10 (S2). In S2, the control unit 21 transmits the position information to the visit management server 10 along with individual identification information of the visitor terminal 20. The individual identification information of the visitor terminal 20 is stored in the memory unit 22 in advance.

The visit management server 10 receives the position information from the visitor terminal 20, and the control unit calculates a necessary time to reach the next delivery destination based on the received position information and on the location information (S3). The control unit 11 can identify which visitor terminal 20 has transmitted the received position information by obtaining the individual identification information of the visitor terminal 20.

In S3, the control unit 11 first identifies the next delivery destination by referring to the delivery completion flag of the data illustrated in FIG. 4. For example, the control unit 11 identifies as the next delivery destination a delivery destination that has the highest place in the delivery order among delivery destinations that have not been visited according to the delivery completion flag. The control unit 11 calculates a necessary time to reach the next delivery destination based on the location information of the next delivery destination and on the position information of the visitor terminal 20.

The control unit 11 determines whether or not the necessary time calculated in 33 is within a threshold (34). When it is determined that the necessary time calculated in S3 is not within a threshold (S4: N), this processing is ended. The subsequent processing steps are not executed because the courier is not approaching the next delivery destination yet in this case.

When it is determined that the necessary time is within a threshold (S4: Y), on the other hand, the control unit 11 transmits a position information obtaining request to the user terminal 30 that is associated with the next delivery destination (S5). In S5, the control unit 11 identifies the user terminal 30 to which a position information obtaining request is to be issued by referring to the data of FIG. 4 as well as to a user ID that is associated with the next delivery destination and individual identification information of each user terminal 30. The control unit 11 requests the identified user terminal 30 to transmit position information.

The user terminal 30 receives the position information obtaining request, and the control unit 31 obtains position information in compliance with the use of the Position obtaining unit 36 to transmit the position information to the visit management server 10 (S6). In S6, the control unit 31 transmits the position information obtained by the position obtaining unit 36 to the visit management server 10 along with individual identification information of the user terminal 30. The individual identification information of the user terminal 30 is stored in the memory unit 32 in advance.

The visit management server 10 receives the position information of the user terminal 30, and the control unit 11 calculates an estimated time until the delivery destination is reached based on the received position information and on the location information (S7). Various known calculation methods can be applied to the calculation of the estimated time in S7 as in S3. While a case of calculating the necessary time and the estimated time in S3 and S7, respectively, is described here, the necessary distance and the estimated distance may be calculated instead.

The control unit 11 determines whether or not the estimated time calculated in S7 is within a threshold (S8). The threshold in S4 and the threshold in S8 may be correlated with each other or may be completely separate values. When it is determined that the estimated time calculated in S7 is within a threshold (S8: Y), the control unit 11 transmits to the user terminal 30 a message to the effect that the delivery will be made as scheduled (S9). The delivery time and the delivery order are not changed in this case.

The user terminal 30 receives the message, and the control unit 31 displays the message on the visit notification screen 40 (S10). The processing is then ended.

When it is determined that the estimated time calculated in S7 is not within a threshold (S8: N), on the other hand, the processing shifts to FIG. 9 and the control unit 11 makes an inquiry to the user terminal 30 about whether or hot delivery is to be delayed (S11). In S11, the control unit 11 generates display data (in the HTML format or the like) of the inquiry screen 50, and transmits the display data to the user terminal 30.

The user terminal 30 receives the inquiry, and the control unit 31 displays the inquiry screen 50 on the display unit 35 to receive an in input of the user's answer (S12). In the case where the user selects the answer button 51 to input an answer to the effect that the parcel is to be delivered as scheduled (S12: as scheduled), the control unit 31 transmits to the visit management server 10 the answer that indicates delivery as scheduled (S13). In S13, the control unit 31 transmits to the visit management server 10 information indicating that the user has selected the answer button 51, for example.

In the case where the user selects the answer button 52 to input an answer to the effect that the delivery is to be delayed (S12: delay), on the other hand, the control unit 31 displays the delivery time window specification screen 60, and transmits to the visit management server 10 the answer that indicates the delaying, of the delivery, along with a delivery date/time or delivery order Specified by the user (S14). In S14, the control unit 31 transmits to the visit management server 10 information indicating that the user has selected the answer button 52, and information indicating which of the buttons 61 has been selected by the user on the delivery time window specification screen 60, for example.

The control unit 11 in the visit management server 10 determines whether or not an answer has been received from the user terminal 30 (S15). In S15, the control unit 11 determines whether or not an answer has been received within a given period since the inquiry to the user terminal 30 has been made. When it is determined that no answer has been received (S15: N), the processing proceeds to S17, which is described later.

When it is determined that an answer has been received (S15: Y), on the other hand, the control unit 11 refers to the answer (S16). When the received answer indicates delivery as scheduled (S16: as scheduled) this processing is ended. The delivery time and the delivery order are not changed in this case.

When the received answer indicates the delaying of the delivery (S16: delay), on the other hand, the control unit 11 delays a delivery time or a delivery order, which is contained in the visit information (S17). In the case where the user has selected the answer button 52 and subsequently specified a delivery date/time or a delivery order, the control unit 11 updates the visit information in S17 based on what has been specified (for example, a delivery date/time or delivery order corresponding to the button 61 that has been selected by the user). In the case where the processing proceeds to S17 without receiving an answer from the user (in other words, when the determination in S15 yields "N" and the processing proceeds to S17), the user does not specify a delivery date/time or a delivery order, and the control unit 11 may therefore update the visit information so that the delivery time is delayed by a given length of time, or so that the user's current place in the delivery order is delayed by a given number of places (for example, two places back).

The control unit 11 transmits to the visitor terminal 20 a message to the effect that the delivery is delayed (S18). In S18, the control unit 11 generates a given message and transmits the message to the visitor terminal 20.

The visitor terminal 20 receives the message, and the control unit 21 displays the received message on the display unit 25 (S19). This processing is then ended. Seeing the message displayed on the visitor terminal 20, the courier understands that the next delivery destination has been changed, and can identify which delivery destination to visit next.

According to the visit management system 1 of the described embodiment, when a courier is nearing a delivery destination, it is determined whether or not the user is at or in the vicinity of the delivery destination to control whether or not delivery is to be delayed, and the chance that the courier meets the user at the delivery destination is accordingly increased. In other words, applying the visit management system 1 to a scene where a courier delivers a parcel increases the chance of successful delivery for the courier. More specifically, while redelivery is necessary in the case where a courier visits a delivery destination but is unable to deliver a parcel due to the user's absence, executing the described processing of the visit management system 1 increases the chance that the courier meets the user (reduces the chance that the courier visits a delivery destination where the user is absent at the time). Cases of redelivery are thus reduced, which, leads to efficient delivery, and the convenience for couriers is improved. Reducing possibilities that allow for redelivery improves the convenience for not only couriers but also users by saving users the trouble of contacting couriers about redelivery (the trouble of requesting redelivery via, for example, phone or the Internet). The visit management system 1, where a parcel is delivered to a delivery destination determined in advance, is further capable of saving a user the trouble of, for example, bringing home a parcel that has been received at a place away from home by his/her own hand.

The visit management system 1, which displays the visit notification screen 40 on the user terminal 30 when the user is at or in the vicinity of the delivery destination, is also capable of effectively preventing a situation in which the user forgetting about delivery goes out and is absent at the time of the courier's visit.

The visit management system 1 does not change the delivery date/time and the delivery order in the case where the user is at or in the vicinity of the delivery destination, and a delivery is therefore made as scheduled in the case where the chances are high that the courier meets the user at the delivery destination at the time the courier visits the delivery destination. In the case where the user is not at or in the vicinity of the delivery destination, on the other hand, the chances are high that the user is absent when the courier visits the delivery destination as scheduled, and the visit management system 1 therefore changes the delivery date/time or the delivery order to prevent a waste of time and resources that is redelivery necessitated by the user s absence at the delivery destination at the time of the courier's visit.

The visit management system 1, which makes an inquiry to the user about whether or not the delivery date/time or the delivery order needs to be changed before changing the delivery date/time or the delivery order, is also capable of preventing a situation in which the delivery date/time or the delivery order is changed despite the user's judgment that the user can return to the destination place in time. In the case where the delivery date/time or the delivery order is changed peremptorily when it is determined that the user is not at or in the vicinity of the delivery destination, the courier may not show up when the user hurries back to the delivery destination. By asking the user's own judgement, the chance that the courier meets the user at the delivery destination at the time the courier visits the delivery destination increases and the chance of successful parcel delivery to the user is improved for the courier. In other words, allowing the user to choose himself/herself whether or not delivery is to be delayed prevents more reliably a situation in which the trouble of arranging for redelivery is necessitated, which is a great benefit particularly to users and improves customer satisfaction in the reception of parcels.

The visit management system 1 is also capable of accurately determining in real time whether or not a visit from a courier is close by determining whether or not the courier is nearing a delivery destination based on position information of the visitor terminal 20.

The visit management system 1 is also capable of accurately determining in real time whether or not a user is at or in the vicinity of a delivery destination by determining whether or not the user is at or in the vicinity of the delivery destination based on position information of the user terminal.

4. Modification Examples

The present invention is not limited to the embodiment described above, and can be modified suitably without departing from the sense of the present invention.

Figure 10:
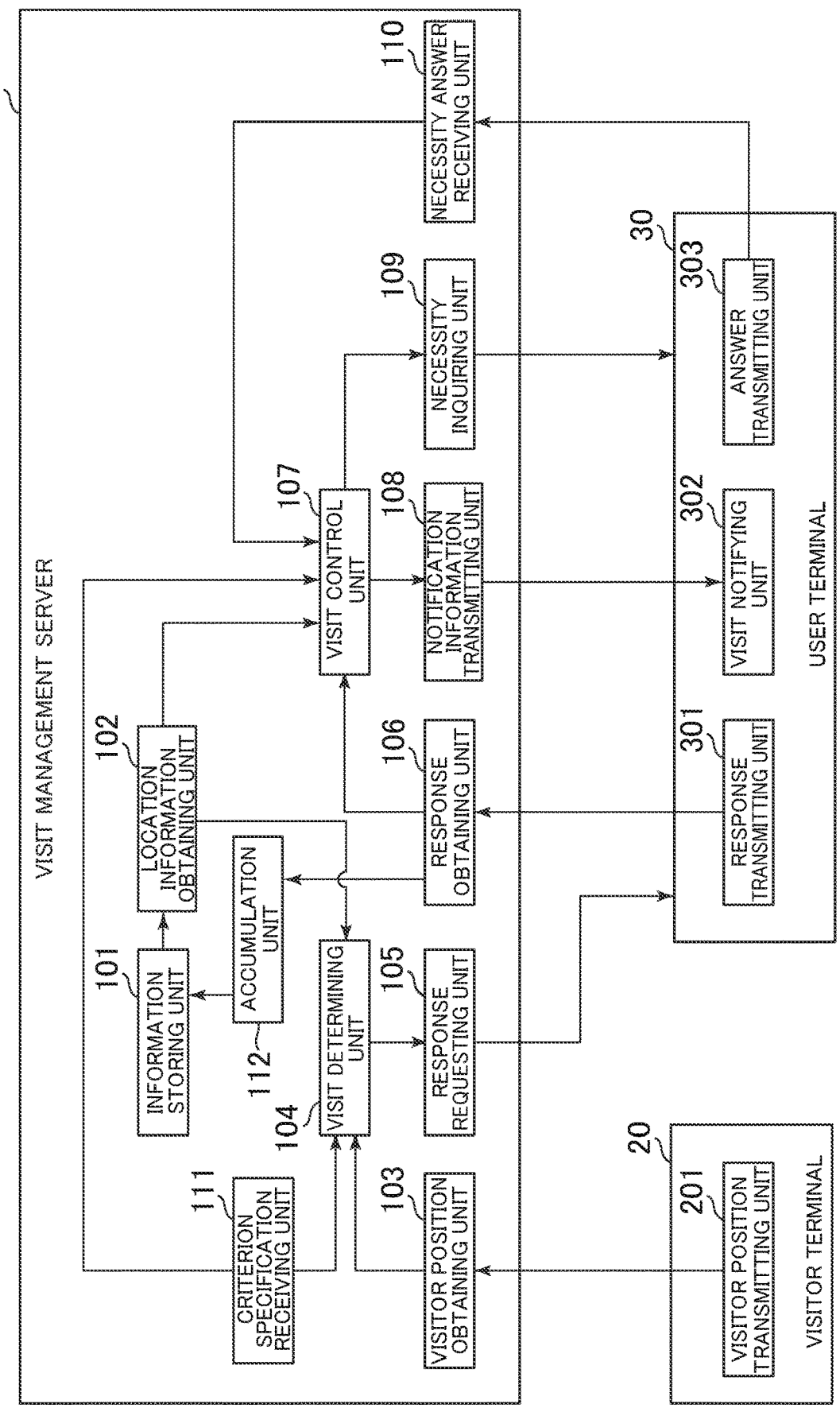
FIG. 10 is a function block diagram of a modification example of the present invention.

FIG. 10 is a function block diagram of modification examples of the present invention. In the modification examples, a criterion specification receiving unit 111 and an accumulation unit 112 are implemented in addition to the functions of the embodiment described above as illustrated in FIG. 10. The criterion specification receiving unit 111 is implemented mainly by the control unit 11 and the communication unit 13. The accumulation unit 112 is implemented mainly by the control unit 11.

(1) For example, a criterion used by the visit determining unit 104 (e.g., threshold in S4) may be specified by a user. This means than the criterion for determining whether or not a courier is nearing a delivery destination may be varied from one user to another by using criteria that are specified by users.

The criterion specification receiving unit 111 is implemented in Modification Example (1). The criterion specification receiving unit 111 is configured to receive the specification of a criterion about time or distance. For example, the criterion specification receiving unit 111 receives a user's specification of a numerical value (e.g., a time or a distance). The criterion received by the criterion specification receiving unit 111 is recorded in the information storing unit 101 in association with the user who has specified the criterion.

The visit determining unit 104 determines whether or not a visit is approaching by determining whether or not the necessary time or the necessary distance to reach a visiting place, which is calculated based on the location information and on the position information of the visitor terminal 20, meets the specified criterion. For example, the visit determining unit 104 determines whether or not the necessary time or the necessary distance meets a criterion specified by a user that is associated with the next delivery destination.

According to Modification Example (1), the criterion for determining whether or not a visit from a courier is approaching can be changed to the user's preference. Modification Example (1) therefore allows a user to set, for example, a relatively large threshold when early advance notification is preferred, and a relatively small threshold when advance notification immediately before delivery suffices.

(2) For example, a criterion used by the visit determining unit 104 (e.g., the threshold in S4) and a criterion used by the visit control unit 107 (e.g., the threshold in S8) may be correlated with each other. For instance, the visit determining unit 104 and the visit control unit 107 may use the same criterion, or the criterion of the visit determining unit 104 and the criterion of the visit control unit 107 may be set so that a gap between the two (e.g., a gap between the thresholds) is within a given amount. To give another example, the threshold in S8 may be set smaller than the threshold in 24. In the case where the threshold in S4 is 15 minutes and the threshold in S8 is 30 minutes, for example, there is a chance that the user has not returned to the delivery destination yet at the time the courier visits the delivery destination. Using criteria that are correlated with each other in the manner described above in such cases enables the visit management system 1 to execute control that fits the reality of delivery business operation.

(3) For example, a criterion used by the visit control unit 107 (e.g., threshold in S8) may be specified by a user. This means that the criterion for determining whether or not a courier is nearing a delivery destination may be varied from one user to another by using criteria that are specified by users.

In Modification Example (3), the criterion specification receiving unit 111 is implemented as in Modification Example (1) to receive a user's specification of a criterion. The visit control unit 107 determines whether or not the estimated time or the estimated distance until a visiting place, which is calculated based on the location information and on the position information of the user terminal 30, meets the specified criterion. For example, the visit control unit 107 determines whether or not the estimated time or the estimated distance meets a criterion specified by a user that is associated with the next delivery destination.

According to Modification Example (3), the criterion for determining whether or not a user is at or in the vicinity of a delivery destination can be changed to the user's preference. Modification Example (3) therefore allows a user to set, for example, a relatively large threshold when the user is often in places distant from the delivery destination, and a relatively small threshold when the user is often in places close to the delivery destination. Control that fits the user's reality can thus be executed.

(4) For example, the visit control unit 107 may change the visit information based on position information of the user terminal 30 in the case where the visit information is to be changed. The visit control unit 107 in this case determines the degree of change (the amount of change) to be made to a time or an order that is indicated by the visit information, based on the position information of the user terminal 30.

The visit control unit 107 changes the visit information based on, for example, a positional relation between a point that is indicated by the position information of the user terminal 30 and a delivery destination that is indicated by the location information. More specifically, the control unit 107 sets the visit information so that a time or an order indicated by the visit information is delayed farther when a point indicated by the position information of the user terminal 30 is farther from a delivery destination indicated by the location information (for example, when the necessary time or the necessary distance is longer).

According to Modification Example (4), the visit information can be changed so that the delivery time or the delivery order is suited to the position information of the user terminal 30. The chance of successful delivery is therefore increased more effectively for couriers.

(5) For example, past position information of the user terminal 30 may be accumulated so that the position of the user terminal 30 is estimated from the accumulated position information when the user terminal 30 is located indoors and the position obtaining unit 36 cannot obtain the position information by using GPS.

The accumulation unit 112 is implemented in Modification Example (5). The accumulation unit 112 is configured to accumulate position information of each user terminal 30. When position information is obtained from one user terminal 30, the accumulation unit 112 records the obtained position information in the information storing unit 101 in association with the individual identification information of that user terminal 30 or a user ID, and with a date/time at which the position information is obtained.

When position information of the user terminal 30 is not received, the visit control unit 107 performs control based on a positional relation that is obtained from the location information and from the accumulated position information. For instance, the visit control unit 107 may use one of the pieces of position information accumulated in the information storing unit 101, or may use a point determined by a plurality of pieces of accumulated position information (e.g, an average value of points indicated by the pieces of accumulated position information). When using a plurality of pieces of position information, the visit control unit 107 may use all pieces of past position information, or may use pieces of position information in a partial period (e.g., a period from a time point that precedes the current time point by a given length of time to the current time point). The visit control unit 107 performs control by obtaining a positional relation based on the position of the user terminal 30 that is estimated in the manner described above. The positional relation is obtained by the same method that is described in the embodiment.

According to Modification Example (5), the chance of successful delivery is increased for couriers even when position information cannot be obtained from the user terminal 30, by estimating the current position of the user from the past position information.

(6) The visit management system 1 does not make an advance inquiry to a user about whether or not delivery is to be delayed when, for example, the necessity inquiring unit 109 does not make an inquiry to the user terminal 30 or when the visit management system 1 does not include the necessity inquiring unit 109. In this case, the visit control unit 107 may have delayed delivery without the user's knowledge and, being unaware that the delivery has been delayed, the user may hurry back to home, for example.

The notification information transmitting unit 108 may therefore transmit to the user terminal 30 information for notifying a change to the visit information when the visit information is changed without an inquiry by the visit control unit 107 to the user terminal 30 about whether or not the change is necessary. In short, the no notification information transmitting unit 108 transmits this information on in the case where inquiry by the necessity inquiring unit 109 is not executed. The visit notifying unit 302 in this case receives the information and notifies the user that the time or order of delivery to the delivery destination has been changed.

Figure 11:
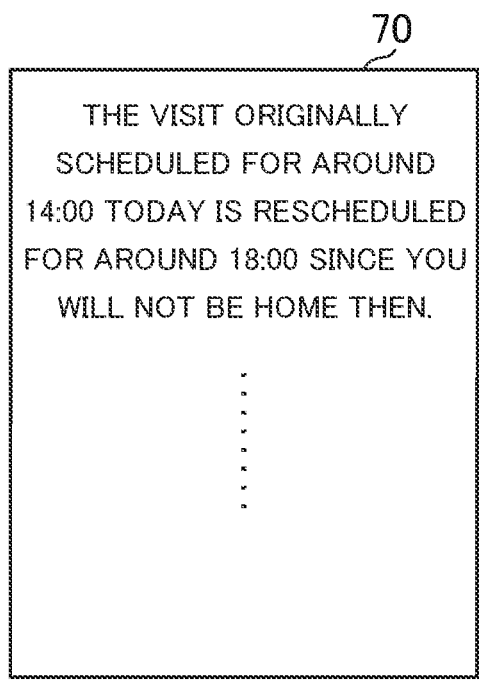
FIG. 11 is a diagram for illustrating an example of a screen that is displayed on the user terminal.

FIG. 11 is a diagram for illustrating an example of a screen that is displayed on the user terminal 30. As illustrated in FIG. 11, the visit notifying unit 302 displays a change in the time or order of delivery to the delivery destination on the change notification screen 70. The visit notifying unit 302 may also notify the user a new delivery time window based on the changed visit information. For instance, the visit notifying unit 302 may notify a new delivery date/time (e.g., expected arrival time) or a new delivery order on the change notification screen 70.

According to Modification Example (6), a change to the delivery date/time or the delivery order can be notified to the user. When a user is not inquired about whether or not the delivery date/time or the delivery order needs to be changed and is not aware of a change made to the delivery date/time or the delivery order by the system, for example, the notification described above lets the user know when the parcel is to arrive at the delivery destination.

In the case where it is determined that the user is in a place too far from the delivery destination to be able to return to the delivery destination by the end of the day (for example, when the user is traveling in a 100 km range or so from home and there is no way for the user to be able to come home by the end of the day), the visit management system 1 may make an inquiry to the user about whether or not the delivery for another day is to be scheduled. Specifically, the necessity inquiring unit 109 may make this inquiry to the user terminal 30 when it is determined that the estimated time or estimated distance calculated by the visit control unit 107 is equal to or more than a threshold for making the inquiry. The visit control unit 107 in this case changes a delivery date/time or delivery order indicated by the visit information so that the delivery to the user is scheduled for another day, based on an answer received by the necessity answer receiving unit 110.

(7) The description given above deals with a case in which position information of the visitor terminal 20 is used to determine whether or not a visit is approaching. However, the method of this determination is not limited to the example described above. In another example, the visit determining unit 104 determines whether or not a visit is approaching based on the visit information. For instance, the visit determining unit 104 determines whether or not a visit is approaching by determining whether or not a gap between the delivery date/time and the current time is within a threshold, or determining whether or not visits up through a visit that is ahead of the user s place in the delivery order by a given number of places (e.g., two places ahead in the delivery order) have been finished.

The visit determining unit 104 may also determine, for example, whether or not the visit terminal 20 has received a given input. For instance, the courier inputs given operation that indicates the impending visit to the delivery destination through the operating unit 24 of the visitor terminal 20, and the visit determining unit 104 determines whether or not this operation input has been obtained from The visitor terminal 20 to determine whether or not a visit is approaching.

The description given above deals with a case in which position information of the user terminal 30 is used to determine whether or not the user is at or in the vicinity of the delivery destination. However, the method of this determination is not limited to the example described above. In another example, the visit control unit 107 determines whether or not the user terminal 30 has received a given input. For instance, the user inputs given operation that indicates whether or not the user is at or in the vicinity of the delivery destination (i.e., the operation indicating a positional relation between the delivery destination and the user terminal 30) through the operating unit 34 of the user terminal 30, and the visit control unit 107 determines whether or not the user is at or in the vicinity of the delivery destination by obtaining the positional relation between the delivery destination and the user terminal 30 from the operation input from the user terminal 30.

A case in which the user agrees to provide position information of the user terminal 30 in advance is described in the embodiment. Alternatively, the visit management system 1 may consider that a user has agreed to provide position information in the delivery of an article for sale to the user in the case where the user purchases the article for sale through an electronic commerce system and selects as an option the use of the delivery method described above at the time of purchase of the article for sale.

Figure 12:
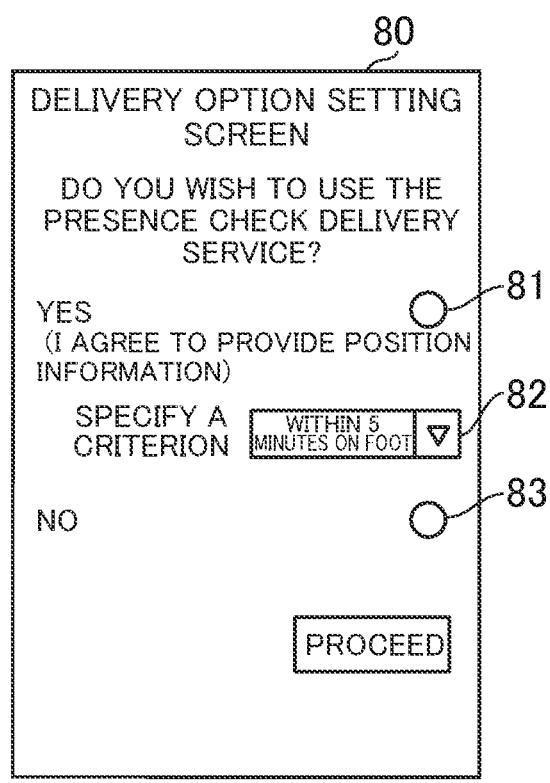
FIG. 12 is a diagram for illustrating an example of a screen that is displayed on the user terminal.

FIG. 12 is a diagram for illustrating an example of a screen that is displayed on the user terminal. A delivery option setting screen 80 illustrated in FIG. 12 is displayed on the display unit 35 when the user purchases an article for sale through an electronic commerce system. For instance, the electronic commerce system makes an inquiry on the delivery option setting screen 80 about whether or not the delivery method of the visit management system 1 is to be used as a delivery option for an article for sale that is ordered by the user.

The delivery method of the visit management system 1 can be used when the user selects a radio button 81. The visit management system 1 may consider that the user has agreed to provide position information in this case. An input of the threshold used in S4 or S8 may be received through an input form 82 at this point. Specifying the threshold through the input form 82 allows the user to set, as the threshold, being within 100 m, 1,000 m, or the like from home, or being within a 5-minute radius or 10-minute radius from home on foot or by car. In the case where the user selects a radio button 83, the article for sale is ordered without the option of using the delivery method of the visit management system 1. Position information is not provided from the user terminal 30 in this case.

The electronic commerce system may allow each user to purchase an article for sale for himself/herself and to purchase an article for sale for another user. In the case where one user purchases an article for sale for another user, the other user may register in advance whether to use the delivery option and the threshold described above in she visit management system 1. The visit management system 1 delays the delivery date/time or place in delivery order of the article for sale, or delivers the article for sale as scheduled, based on what is registered by the other user. The visit management system 1 may also use different methods of determining whether or not the user is at or in the vicinity of the delivery destination, depending on whether or not the user has agreed to provide position information.

For example, in the case where the visit management system 1 calculates the visiting route of a courier based on the visit information and the visit information is changed by the visit control unit 107, the visiting route may be recalculated based on the changed visit information. Various known route calculation methods can be applied to the calculation of the visiting route.

The description given above deals with a case in which delivery is delayed when the user is not at or in the vicinity of the delivery destination. The visit control unit 107 may also advance the delivery time or the place in the delivery order in the case where the user is at or in the vicinity of the delivery destination. This way, the courier accomplishes efficient delivery by delivering earlier than originally scheduled in the case where the user is at or in the vicinity of the delivery destination and the user's chance of receiving the parcel is accordingly high.

For example, the visit management server 10 may be managed by a courier that visits users, or may be managed by an administrator who is not the courier. In the case where the visit management server 10 is managed by a company running an electronic commerce system through which a user purchases an article for sale, for example, the date/time or order of delivery of articles for sale by a courier that is affiliated with the electronic commerce system is controlled.

The description given above takes a case of delivering a parcel to a delivery destination as an example of a visit from a courier. The visit management system 1 may be used also when a courier visits to pick up a parcel. In this case, "delivery" can be read as "pickup" in the processing procedures described above. Specifically, the visit determining unit 104 determines whether or not the courier is nearing the pickup destination, and the visit control unit 107 controls whether to change a pickup date/time or a pickup order that is indicated by the visit information, based on whether or not the user is at or in the vicinity of the pickup destination.

For example, some of the functions described as ones implemented by the visit management server 10 may be implemented by the visitor terminal 20 or the user terminal 30. For instance, the visitor terminal 20 may implement the visit determining unit 104 to transmit only the result of the determination to the visit management server 10. Similarly, the user terminal 30 may determine whether or not the user is at or in the vicinity of the delivery destination to transmit only the result of the determination to the visit management server 10.

The visit management system 1 described above includes the visit management server 10, the visitor terminal 20, and the user terminal 30. Alternatively, only the visit management server 10 may be a computer serving as the visit management system 1. The visitor terminal 20 and the user terminal 30 in this case transmit position information to the visit management system 1 and receive various types of information from the visit management system 1. Other functions than the response requesting unit 105, the response obtaining unit 106, and the visit control unit 107 may be omitted from the visit management system 1. The omitted functions in this case may be implemented by another system that is connected to the visit management system 1.

While the description given above takes as an example a case in which a courier visits a user, the visit management system according to the present invention can be applied various systems that involve managing visit information. The visit management system according to the present invention is applicable also to a scene where a visitor visits a place that is associated with a user to collect bills, and other similar scenes.

In other words, the technical concept according to the embodiment is applicable not only to delivery but also to any scene where a visitor needs to meet (face to face) a visited person at a visit destination for parcel pickup, bill collecting, home-call contract, and the like. In the case where personal identification is necessary, in particular, the fact that the visited person is present at the visit destination may be treated as a type of personal identification information.

The invention claimed is:

1. A delivery management system comprising:
a visit management server;
a visitor terminal; and a
user terminal;
   wherein the visit management server is in communication with the visitor terminal and the user terminal;
   wherein the visit management server comprises:
   at least one processor and at least one memory, wherein the at least one processor and the at least one memory are configured to:
   obtain delivery information, the delivery information comprising:
      a delivery date/time for a plurality of users,
      a delivery order which indicates an order in which packages are to be delivered to the plurality of users,
      delivery destination information associated with each package which indicates a delivery place, and
      a visit completion flag which indicates whether the visitor terminal has visited a given user at a given delivery place;

wherein a next user who is to receive a package is chosen by selecting a user with a highest ranking in the delivery order that has not been visited by the visitor terminal, according to the visit completion flag;

the at least one processor and the at least one memory of the visit manager server are further configured to:

obtain the delivery place for the next user;

receive transmitted position information from the visitor terminal;

calculate a first amount of time or a first distance required for the visitor terminal to reach the delivery place and determine if the first amount of time or first distance is within a first threshold amount;

request position information to the user terminal of the next user if it is determined that the visitor terminal is within a pre-determined first threshold amount of time or distance;

obtain position information from the user terminal of the next user based on the position information request;

calculate a second amount of time or distance required for the user terminal of the next user to reach the next delivery place and determine if the second amount of time or distance is within a second threshold amount;

determine whether or not the delivery information is to be changed based on the delivery place and the position information of the user terminal;

delay the delivery date/time indicated by the delivery information and/or change the delivery order indicated by the delivery information if it is determined that the delivery information is to be changed; and transmit to the user terminal a notification indicating that the delivery is delayed if the delivery order has been changed.

2. The delivery management system according to claim 1, wherein the at least one processor transmits, to the user terminal, information for notifying that a delivery is approaching if the obtained positional information indicates that the user is in a range set with the delivery place as a reference.

3. The delivery management system according to claim 1, wherein the at least one processor keeps the delivery information unchanged if the obtained positional information of the user terminal indicates that the user is in a range set with the delivery place as a reference, and is configured to delay the delivery time and the delivery order, which are contained in the delivery information if the obtained positional information of the user terminal indicates that the user is not in a predetermined range.

4. The delivery management system according to claim 3, wherein the at least one processor:

makes an inquiry to the user terminal about whether or not the change of delivery information is necessary, if where the obtained positional information indicates that the user is not in the range;

receives an answer to the inquiry, which is input to the user terminal;

keeps the delivery information unchanged if the received answer indicates that the change is unnecessary; and delays the delivery time and the delivery order, which are contained in the delivery information if an answer indicating that the change is unnecessary is not received.

5. The delivery management system according to claim 1, wherein the at least one processor:

determines whether or not a delivery is approaching by determining whether or not a necessary time or a necessary distance to reach the delivery place, which is calculated based on the delivery place and on the position information of the visitor terminal, meets a first threshold; and determines whether or not a time or a distance until the delivery place, which is calculated based on the delivery place and on the position information of the user terminal, meets a second threshold, and wherein the first threshold and the second threshold are correlated with each other.

6. The delivery management system according to claim 1, wherein the at least one processor:

receives specification of the second threshold about time or distance; and determines whether or not a time or a distance to reach the delivery place, which is calculated based on the delivery place and on the position information of the user terminal, meets the second threshold.

7. The delivery management system according to claim 1, wherein the at least one processor changes the delivery information based on the position information of the user terminal if the delivery information is to be changed.

8. The delivery management system according to claim 1, wherein the at least one processor:

accumulates the position information of the user terminal in the memory; and performs control based on the positional information that is obtained from the delivery place and from the accumulated position information, if the position information of the user terminal is not obtained.

9. The delivery management system according to claim 1, wherein the at least one processor transmits, to the user terminal, information for notifying a change to the delivery information if the delivery information is changed without making an inquiry to the user terminal about whether or not the change of the delivery information is necessary.

10. A non-transitory computer-readable information storage medium having stored thereon a program for causing a computer, which is configured to manage delivery information and be in communication with a visitor terminal and a user terminal, which comprises a delivery date/time, a delivery order which indicates an order in which packages are to be delivered to a plurality of users, delivery destination information associated with each package which indicates a delivery place associated with each user who receives a package, and a visit completion flag which indicates whether the visitor terminal has visited a given user at a given delivery place to:

wherein a next user who is to receive a package is chosen by selecting a user with a highest ranking in the delivery order that has not been visited by the visitor terminal, according to the visit completion flag;

obtain the delivery place for the next user;

receive transmitted position information from the visitor terminal;

calculate a first amount of time or a first distance required for the visitor terminal to reach the delivery place and determine if the first amount of time or first distance is within a first threshold amount;

request position information to a user terminal of the next user if it is determined that the visitor terminal is within a pre-determined first threshold amount of time or distance;

obtain the position information from the user terminal of the next user based on the position information request;

calculate a second amount of time or distance required for the user terminal of the next user to reach the next delivery place and determine if the second amount of time or distance is within a second threshold amount;

determine whether or not the delivery information is to be changed based on the delivery place and the position information of the user terminal;

delay the delivery date/time indicated by the delivery information and/or change the delivery order indicated by the delivery information if it is determined that the delivery information is to be changed; and transmit to the user terminal a notification indicating that the delivery is delayed if the delivery order has been changed.

11. A delivery management method for managing delivery information by a visit management server which is in communication with a visitor terminal and a user terminal, the delivery information comprising a delivery date/time, a delivery order which indicates an order in which packages are to be delivered to a plurality of users, delivery destination information associated with each package which indicates a place associated with each user who receives a package, and a visit completion flag which indicates whether the visitor terminal has visited a given user at a given delivery place, the delivery management method comprising:

wherein a next user who is to receive a package is chosen by selecting a user with a highest ranking in the delivery order that has not been visited by the visitor terminal, according to the visit completion flag;

obtaining the delivery place for the next user;

receiving transmitted position information from the visitor terminal;

calculating a first amount of time or a first distance required for the visitor terminal to reach the delivery place and determine if the first amount of time or first distance is within a first threshold amount;

requesting, by the visit management server, position information to a user terminal of the next user if it is determined that the visitor terminal is within a predetermined first threshold amount of time or distance;

obtaining, by the visit management server, the position information from the user terminal of the next user based on the position information request;

calculating a second amount of time or distance required for the user terminal of the next user to reach the next delivery place and determine if the second amount of time or distance is within a second threshold amount;

determining, by the visit management server, whether or not the delivery information is to be changed based on the delivery place and the position information of the user terminal;

delay the delivery date/time indicated by the delivery information and/or changing the delivery order indicated by the delivery information if it is determined that the delivery information is to be changed; and transmitting to the user terminal a notification that the delivery order is delayed if the delivery order has been changed.

12. The delivery management system according to claim 1, wherein the at least one processor:

calculates a delivering route based on the delivery information; and recalculates the delivering route, if the delivery information is changed, based on the changed delivery information.

13. The delivery management system according to claim 1, further comprising a visitor terminal that comprises a GPS sensor, wherein the user terminal comprises a GPS sensor, wherein the at least one processor further:

determines whether the delivery is approaching based on a position information detected by the GPS sensor of the visitor terminal; and obtains the positional information based on a position information detected by the GPS sensor of the user terminal.

14. The delivery management system according to claim 1, wherein the at least one processor calculates the second amount or time or distance by substituting a point that the location information indicates and a point that the position information of the user terminal indicates in a numerical expression.

15. The non-transitory computer-readable information storage medium of claim 10 further configured to:

transmit, if a given response request is received from the delivery management system, a response to the received response request to the delivery management system; and notify the user that a delivery is approaching based on information that is received from the delivery management system.

* * * * *